(12) United States Patent
Brown et al.

(10) Patent No.: US 12,149,017 B2
(45) Date of Patent: Nov. 19, 2024

(54) ANTISPARK BATTERY CONNECTOR

(71) Applicant: Textron Innovations Inc., Providence, RI (US)

(72) Inventors: Jason Brown, Hurst, TX (US); Kynn J. Schulte, Arlington, TX (US)

(73) Assignee: Textron Innovations Inc., Providence, RI (US)

( * ) Notice: Subject to any disclaimer, the term of this patent is extended or adjusted under 35 U.S.C. 154(b) by 0 days.

(21) Appl. No.: 18/464,868

(22) Filed: Sep. 11, 2023

(65) Prior Publication Data
US 2023/0420878 A1    Dec. 28, 2023

Related U.S. Application Data

(62) Division of application No. 17/108,116, filed on Dec. 1, 2020, now Pat. No. 11,791,581.

(51) Int. Cl.
| | |
|---|---|
| *H01R 11/28* | (2006.01) |
| *B64C 27/04* | (2006.01) |
| *G01K 7/22* | (2006.01) |
| *G05D 1/00* | (2006.01) |
| *H01R 9/24* | (2006.01) |
| *H01R 13/20* | (2006.01) |
| *H01R 43/20* | (2006.01) |

(52) U.S. Cl.
CPC ............. *H01R 13/20* (2013.01); *B64C 27/04* (2013.01); *G01K 7/22* (2013.01); *G05D 1/0808* (2013.01); *H01R 9/2491* (2013.01); *H01R 43/205* (2013.01); *H01R 2201/26* (2013.01)

(58) Field of Classification Search
CPC .... H01R 13/20; H01R 9/2491; H01R 43/205; H01R 2201/26; H01R 12/722; H01R 12/7088; B64C 27/04; G01K 7/22; G05D 1/0808; H02J 7/00308; H02J 7/0042
See application file for complete search history.

(56) References Cited

U.S. PATENT DOCUMENTS

| | | |
|---|---|---|
| 4,396,881 A | 8/1983 | Cook et al. |
| 6,416,356 B1 | 7/2002 | Hutchins et al. |
| 10,250,056 B2* | 4/2019 | Miller ................ H02J 7/00714 |
| 10,266,133 B2 | 4/2019 | Tang et al. |
| 2002/0041174 A1 | 4/2002 | Purkey |
| 2004/0062387 A1 | 4/2004 | O'Connor |
| 2008/0079389 A1 | 4/2008 | Howell et al. |
| 2010/0066280 A1 | 3/2010 | Marchand et al. |
| 2011/0028012 A1 | 2/2011 | Chien et al. |
| 2013/0233977 A1 | 9/2013 | Smiley et al. |

(Continued)

*Primary Examiner* — Abdullah A Riyami
*Assistant Examiner* — Nelson R. Burgos-Guntin
(74) *Attorney, Agent, or Firm* — Slater Matsil, LLP

(57) ABSTRACT

In an embodiment, a battery connector includes: power terminals configured to be coupled to a load having an input capacitance; power pins electrically coupled to the power terminals; a charge pin, the charge pin being longer than each of the power pins; and an antispark circuit electrically interposed between the charge pin and the power terminals, the antispark circuit including: a dissipation circuit configured to charge the input capacitance of the load in response to a battery being coupled to the charge pin; and a delay circuit configured to delay charging of the input capacitance of the load for a predetermined duration after the battery is coupled to the charge pin.

20 Claims, 11 Drawing Sheets

(56) References Cited

U.S. PATENT DOCUMENTS

| | | | |
|---|---|---|---|
| 2015/0047947 A1 | 2/2015 | Tait | |
| 2015/0061575 A1 | 3/2015 | Han et al. | |
| 2015/0349569 A1 | 12/2015 | Christensen et al. | |
| 2016/0072329 A1* | 3/2016 | Miller | G06F 1/26 320/104 |
| 2016/0241029 A1 | 8/2016 | Hodrinsky et al. | |
| 2017/0012448 A1* | 1/2017 | Miller | H02J 7/0029 |
| 2017/0047681 A1 | 2/2017 | Yeon | |
| 2017/0201106 A1 | 7/2017 | Mecca et al. | |
| 2018/0219404 A1 | 8/2018 | Urbach et al. | |
| 2018/0233934 A1* | 8/2018 | Miller | H02J 7/0029 |
| 2018/0366886 A1 | 12/2018 | Chen et al. | |
| 2020/0287397 A1 | 9/2020 | Jiao et al. | |
| 2022/0173542 A1 | 6/2022 | Brown et al. | |
| 2023/0010475 A1* | 1/2023 | Miller | H02J 7/0029 |

* cited by examiner

ANTISPARK BATTERY CONNECTOR

PRIORITY CLAIM AND CROSS-REFERENCE

This application is a divisional of U.S. patent application Ser. No. 17/108,116, filed on Dec. 1, 2020, entitled "Antispark Battery Connector," which application is hereby incorporated herein by reference.

BACKGROUND

Electrical connectors are electromechanical devices that join electrical conductors to create an electrical circuit. Some electrical connectors include a plug that connects to a corresponding socket. Electrical connectors may be removable or permanent. The use of removable connectors can help simplify assembly and disassembly of an electronic device.

SUMMARY

In an embodiment, a battery connector includes: power terminals configured to be coupled to a load having an input capacitance; power pins electrically coupled to the power terminals; a charge pin, the charge pin being longer than each of the power pins; and an antispark circuit electrically interposed between the charge pin and the power terminals, the antispark circuit including: a dissipation circuit configured to charge the input capacitance of the load in response to a battery being coupled to the charge pin; and a delay circuit configured to delay charging of the input capacitance of the load for a predetermined duration after the battery is coupled to the charge pin.

In some embodiments of the battery connector, the dissipation circuit includes a resistor, the delay circuit includes a thermistor, and the resistor and the thermistor are each in series with the load. In some embodiments of the battery connector, the dissipation circuit includes a first resistor, and the delay circuit includes: a switch connected in series with the battery, the first resistor, and the load; a timer circuit configured to produce a timer signal, where the timer signal begins increasing when the battery is coupled to the charge pin; a reference circuit configured to produce a reference signal; and a compare circuit coupled to the reference circuit, the timer circuit, and the switch, the compare circuit configured to turn off the switch when the timer signal is less than the reference signal, the compare circuit configured to turn on the switch when the timer signal is greater than the reference signal. In some embodiments of the battery connector, the compare circuit is an op-amp, the reference circuit is coupled to an inverting input of the op-amp, the timer circuit is coupled to a non-inverting input of the op-amp. In some embodiments of the battery connector, the switch is a MOSFET. In some embodiments of the battery connector, the switch is a mechanical relay.

In an embodiment, a rotorcraft includes: pilot flight controls; a flight control computer coupled to the pilot flight controls, the flight control computer configured to receive input signals from the pilot flight controls and generate control signals according to the input signals; an engine including an engine control computer and a power converter, the engine control computer coupled to the flight control computer, the flight control computer further configured to transmit the control signals to the engine control computer, the power converter including power terminals and a battery connector, the battery connector including: an antispark circuit coupled to the power terminals; a charge pin coupled to the antispark circuit; and power pins coupled to the power terminals, the charge pin being longer than each of the power pins.

In some embodiments of the rotorcraft, the flight control computer includes data terminals, and the battery connector further includes: data pins coupled to the data terminals, the data pins having a smaller width and a smaller spacing than the power pins. In some embodiments of the rotorcraft, the battery connector further includes: a circuit board, where each of the data pins, the power pins, and the charge pin are attached to the circuit board; and a connector housing attached to the circuit board, where the data pins, the power pins, and the charge pin each extend from a same side of the connector housing. In some embodiments of the rotorcraft, the data terminals are part of a serial communications bus for the flight control computer. In some embodiments, the rotorcraft further includes: a battery connected to the power converter with the battery connector. In some embodiments of the rotorcraft, the power converter has an input capacitance, and the antispark circuit includes: a resistor in series with the input capacitance, the resistor and the input capacitance forming a RC circuit having a transient response time of less than 250 ms. In some embodiments of the rotorcraft, the antispark circuit further includes: a delay circuit in series with the resistor and the input capacitance, the delay circuit including passive devices and being free of active devices. In some embodiments of the rotorcraft, the delay circuit includes a thermistor. In some embodiments of the rotorcraft, the antispark circuit further includes: a delay circuit in series with the resistor and the input capacitance, the delay circuit including passive devices and active devices. In some embodiments of the rotorcraft, the delay circuit includes: a switch connected in series with the resistor and the input capacitance; a timer circuit configured to produce a timer signal; a reference circuit configured to produce a reference signal; and a compare circuit coupled to the reference circuit, the timer circuit, and the switch, the compare circuit configured to turn off the switch the timer signal is less than the reference signal, the compare circuit configured to turn on the switch when the timer signal is greater than the reference signal.

In an embodiment, a method includes: inserting a charge pin of a battery connector into a socket of a battery, the charge pin coupled to an antispark circuit, the antispark circuit coupled to power terminals of a load; charging an input capacitance of the load with the antispark circuit; and after charging the input capacitance of the load, inserting power pins of the battery connector into the socket, the power pins directly coupled to the power terminals of the load, the charge pin being longer than the power pins.

In some embodiments, the method further includes: after charging the input capacitance of the load, inserting data pins of the battery connector into the socket, the data pins coupled to a computer. In some embodiments, the method further includes: delaying the charging the input capacitance of the load for a predetermined duration after inserting the charge pin into the socket. In some embodiments of the method, charging the input capacitance of the load includes dissipating energy from the battery in a resistor of the battery connector.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

Illustrative embodiments of the system and method of the present disclosure are described below. In the interest of clarity, all features of an actual implementation may not be described in this specification. It will of course be appreciated that in the development of any such actual embodiment, numerous implementation-specific decisions may be made to achieve the developer's specific goals, such as compliance with system-related and business-related constraints, which will vary from one implementation to another. Moreover, it should be appreciated that such a development effort might be complex and time-consuming but would nevertheless be a routine undertaking for those of ordinary skill in the art having the benefit of this disclosure.

Reference may be made herein to the spatial relationships between various components and to the spatial orientation of various aspects of components as the devices are depicted in the attached drawings. However, as will be recognized by those skilled in the art after a complete reading of the present disclosure, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

According to various embodiments, a battery connector includes a charge pin that is longer than its power pins. The charge pin is coupled to an antispark circuit. Because the charge pin is longer than the power pins, it may be connected to a battery before the power pins, so that the antispark circuit may charge the input capacitance of a load powered by the battery before the power pins are connected to the battery. Sparking (or arcing) may thus be avoided (e.g., dampened or eliminated) during installation of the battery.

Figure 1:
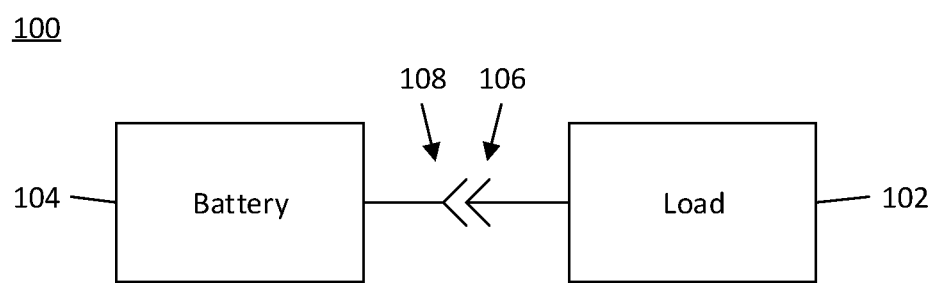
FIG. 1 is a block diagram of aspects of an electronic device, according to some embodiments.

FIG. 1 is a block diagram of aspects of an electronic device 100, according to some embodiments. The electronic device wo includes a load 102 and a battery 104. As will be discussed in greater detail below, the load 102 may be part of a vehicle, such as a power converter, which may be part of an engine or propulsion unit of the vehicle. The battery 104 is connected to the load 102 by a connector. In this embodiment, the load 102 includes a battery connector 106 (e.g., a male connector) and the battery 104 includes a battery socket 108 (e.g., a female connector). Installing the battery 104 in the electronic device wo includes inserting the battery connector 106 into the battery socket 108 to mechanically and electrically connect the battery 104 to the load 102. In another embodiment, the load 102 includes a battery socket, and the battery 104 includes a battery connector. As will be discussed in greater detail below, the battery connector 106 has power connections and data connections, so that a single connector may be used to carry power and data signals.

Figure 2A:
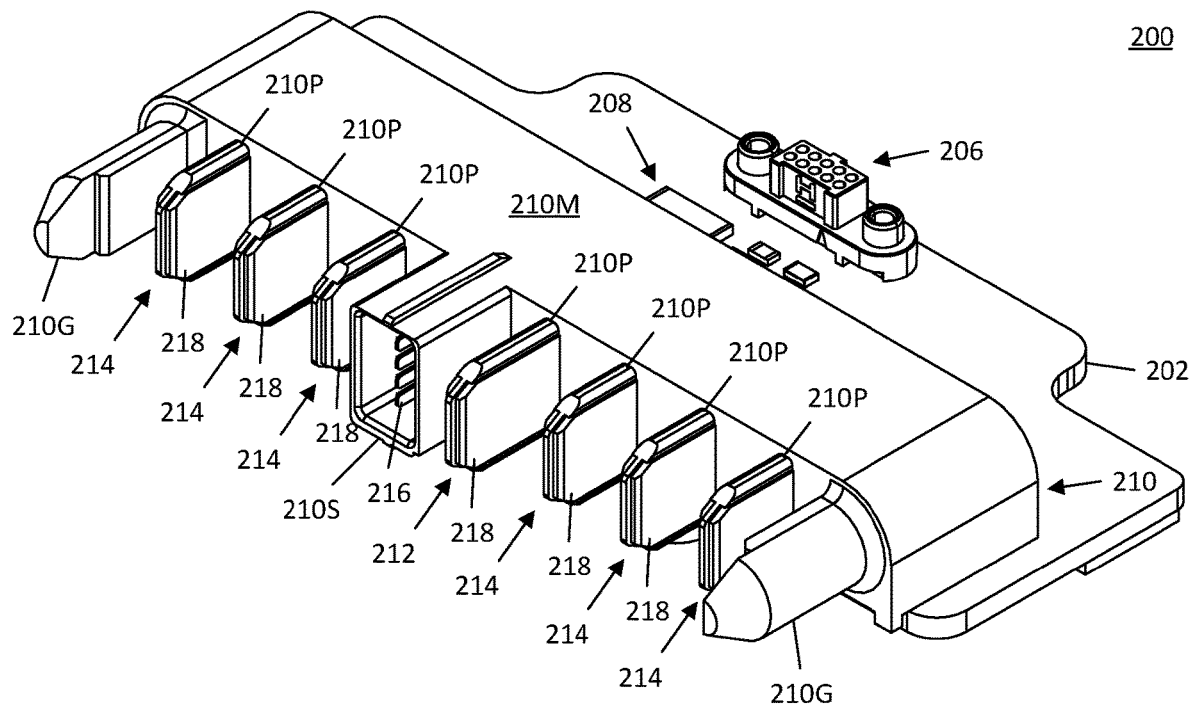
FIGS. 2A and 2B are three-dimensional views of a battery connector, according to some embodiments.
Figure 2B:
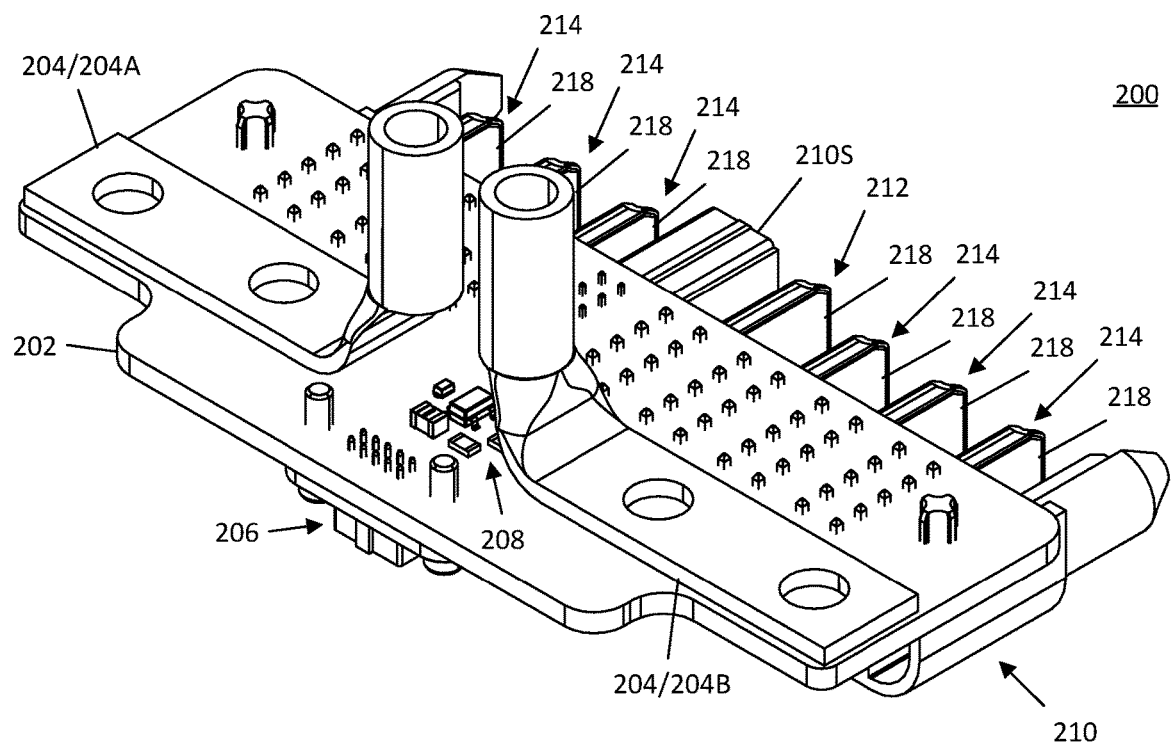

FIGS. 2A and 2B are three-dimensional views of a battery connector 200, according to some embodiments. FIG. 2A is a perspective view of the upper portion of the battery connector 200, and FIG. 2B is a perspective view of the lower portion of the battery connector 200. The battery connector 200 is a male connector which can be part of a load or part of a battery, to facilitate installation of the battery in an electronic device. In this embodiment, the battery connector 200 is part of a load, and includes features for mounting the battery connector 200 to the electronic device. The battery connector 200 includes a printed circuit board 202, power terminals 204, data terminals 206, an antispark circuit 208, a connector housing 210, a charge pin 212, power pins 214, and data pins 216.

The printed circuit board 202 mechanically supports and electrically connects the components of the battery connector 200. The printed circuit board 202 includes one or more conductive traces among/on layers of an insulating material. Example insulating materials include a fiberglass resin, a bismaleimide-triazine resin, build up films, and the like. The conductive traces electrically interconnect the various components of the battery connector 200.

The power terminals 204 are attached to the printed circuit board 202, such as to the bottom of the printed circuit board 202. The power terminals 204 can be formed of a metal such as copper, aluminum, gold, combinations thereof, or the like. In some embodiments, the power terminals 204 are bolted to the printed circuit board 202, and are in physical contact with the conductive traces of the printed circuit board 202. The power terminals 204 are coupled to power connections of the electronic device for distributing power from a battery to the load after the battery is installed. For example, the power terminals 204 of the battery connector 200 may be coupled to power terminals of a power converter. In some embodiments, the power terminals 204 are wire lugs that are coupled to the power connections of the electronic device.

The data terminals 206 are attached to the printed circuit board 202, such as to the top of the printed circuit board 202. The data terminals 206 can be push-pins in a housing. In some embodiments, solder is used to physically and electrically couple the data terminals 206 to the conductive traces of the printed circuit board 202. The data terminals 206 are coupled to data connections of the electronic device for carrying control and/or sensor signals between the electronic device and a battery after the battery is installed. For example, the data terminals 206 of the battery connector 200 may be coupled to data terminals of a computer in the electronic device. The data terminals 206 carry smaller signals (e.g., those of a lower current/voltage) than the power terminals 204, and so can have a smaller width and/or a smaller spacing than the power terminals 204. The data terminals 206 may be part of a serial communications bus for the computer.

The antispark circuit 208 includes surface mount devices (SMDs) attached to the printed circuit board 202, such as to the top and/or the bottom of the printed circuit board 202. The antispark circuit 208 is coupled to the power terminals 204, and helps avoid sparking when installing a battery in the electronic device. Some loads, such as power converters, have a large input capacitance. Because an uncharged capacitor behaves as a short circuit, coupling the full voltage source of a battery to the load while the input capacitance of the load is uncharged can cause short-circuit induced sparking. As will be discussed in greater detail below, the antispark circuit 208 (through the charge pin 212) at least partially charges the input capacitance of the load before the full voltage source of the battery is coupled to the load, thereby avoiding sparking when the battery is installed. Several antispark circuits are discussed in greater detail below. In some embodiments, the antispark circuit 208 includes passive devices, such as resistors, capacitors, inductors, and the like, and is free of active devices (e.g., solid state devices), such as transistors, diodes, operational amplifiers, and the like. In some embodiments, the antispark circuit 208 includes both passive devices and active devices.

The connector housing 210 protects and houses the components of the battery connector 200. The connector housing 210 has a main portion 210M, guiding portions 210G, a shell portion 210S, and projecting portions 210P. The main portion 210M is attached to the printed circuit board 202. The guiding portions 210G act as guide rails when inserting the battery connector 200 into a corresponding battery socket, and have tapered ends to assist with the initial insertion of the guiding portions 210G into the socket. The shell portion 210S surrounds and protects the data pins 216. The projecting portions 210P constitute portions of the charge pin 212 and the power pins 214, providing mechanical support to the pins. In some embodiments, the connector housing 210 also includes mounting portions (not shown) for mounting the battery connector 200 to the electronic device. For example, the battery connector 200 could be mounted to a frame of an engine or propulsion unit. In some embodiments, the various portions of the connector housing 210 are formed of a continuous material and thus integrated together into a single element. In some embodiments, the connector housing 210 is modular and includes a plurality of discrete components that interlock to form the connector housing 210. The connector housing 210 is formed of an insulating material, such as plastic, nylon, or the like, which can be molded into the shape of the connector housing 210 or the shape of the components of the connector housing 210.

The charge pin 212 and the power pins 214 each extend away from a same side of the main portion 210M of the connector housing 210. The charge pin 212 and the power pins 214 are each split pins that include a projecting portion 210P of the connector housing 210 and two conductors 218, with the projecting portion 210P being disposed between the conductors 218. The conductors 218 can be formed of a metal such as copper, aluminum, gold, combinations thereof, or the like. The conductors 218 are attached to the printed circuit board 202. In some embodiments, solder is used to physically and electrically couple the conductors 218 to the conductive traces of the printed circuit board 202. The conductors 218 extend through openings in the side of the main portion 210M of the connector housing 210, with the openings being adjacent the projecting portion 210P of the connector housing 210.

The conductors 218 of the power pins 214 are directly coupled to the power terminals 204 by the conductive traces of the printed circuit board 202. No intervening circuits are interposed between the conductors 218 of the power pins 214 and the power terminals 204. The conductors 218 of the charge pin 212 are indirectly coupled to the power terminals 204 by the conductive traces of the printed circuit board 202. The antispark circuit 208 is electrically interposed between the conductors 218 of the charge pin 212 and the power terminals 204. During installation, the charge pin 212 and the power pins 214 will be coupled to the power output of the battery. The power pins 214 will may each have the same length, or may have different lengths. As will be discussed in greater detail below, the charge pin 212 is longer than each of the power pins 214.

The charge pin 212 and the power pins 214 carry larger signals (e.g., those of a higher current/voltage) than the data pins 216, and so can have a larger width and/or a larger spacing than the data pins 216. Larger widths are used for signals of higher current. Larger spacings are used for signals of higher voltage. The charge pin 212 and the power pins 214 carry signals of larger voltage than the data pins 216, and so have at least a larger spacing than the data pins 216. The power pins 214 carry signals of larger current than the data pins 216, and so also have a larger width than the data pins 216. The charge pin 212 may (or may not) also have a larger width than the data pins 216.

The data pins 216 each extend away from the same side of the main portion 210M of the connector housing 210 as the charge pin 212 and the power pins 214. The data pins 216 extend through openings in the side of the main portion 210M of the connector housing 210, with the openings being surrounded by the shell portion 210S of the connector housing 210. Because the data pins 216 share the connector housing 210 with the charge pin 212 and the power pins 214, all of the pins may thus be connected in a single step when a battery is installed in the electronic device. Installation procedures may thus be simplified for the operator.

The data pins 216 are directly coupled to the data terminals 206 by the conductive traces of the printed circuit board 202. No intervening circuits are interposed between the data pins 216 and the data terminals 206. Further, the conductive traces of the printed circuit board 202 that couple the data pins 216 to the data terminals 206 can have a smaller width and/or a smaller spacing than the conductive traces of the printed circuit board 202 that couple the power pins 214 to the power terminals 204. During installation, the data pins 216 will be coupled to controllers and/or sensors of the battery. The data pins 216 may each have the same length, or may have different lengths.

An operator may install a battery into an electronic device by initially inserting the guiding portions 210G of the connector housing 210 into a corresponding battery socket, and then pushing the charge pin 212 and the power pins 214 into the socket. The charge pin 212 is longer than each of the data pins 216 and the power pins 214. In other words, the charge pin 212 extends further away from the side of the connector housing 210 than each of the data pins 216 and the power pins 214. As such, when installing a battery in the electronic device, the charge pin 212 (and thus the antispark circuit 208) will be electrically coupled to the battery before the power pins 214 (and thus the power terminals 204) are electrically coupled to the battery. The difference in length between the charge pin 212 and the power pins 214 is selected so that a desired delay is achieved between connection of the charge pin 212 and connection of the power pins 214. During this connection delay, the antispark circuit 208 charges the input capacitance of the load, thus avoiding sparking when the power pins 214 are coupled to the battery. Once the power pins 214 are coupled to the battery, the antispark circuit 208 is shorted out and is no longer coupled to the battery. A typical operator will insert the battery connector 200 into a corresponding battery socket at an insertion speed in the range of about 0.4 meters/second to about 0.6 meters/second. In some embodiments, the charge pin 212 is at least about 2 mm longer than each of the power pins 214, such as from about 2 mm to about 10 mm longer than the power pins 214, achieving a connection delay of less than about 250 ms, such as a connection delay in the range of about 3 ms to about 250 ms at such an insertion speed. It should be appreciated that other connection delays may be used based on the system and how the connector is installed. As will be discussed in greater detail below, such a connection delay is sufficient to allow the input capacitance of the load to be charged enough to avoid sparking. Avoid sparking helps increase operator safety and prolongs the lifespan of the power pins 214. For example, sparking can degrade the conductors 218 of the power pins 214, and so avoid sparking reduces degradation and increases their lifespan.

Figure 3:
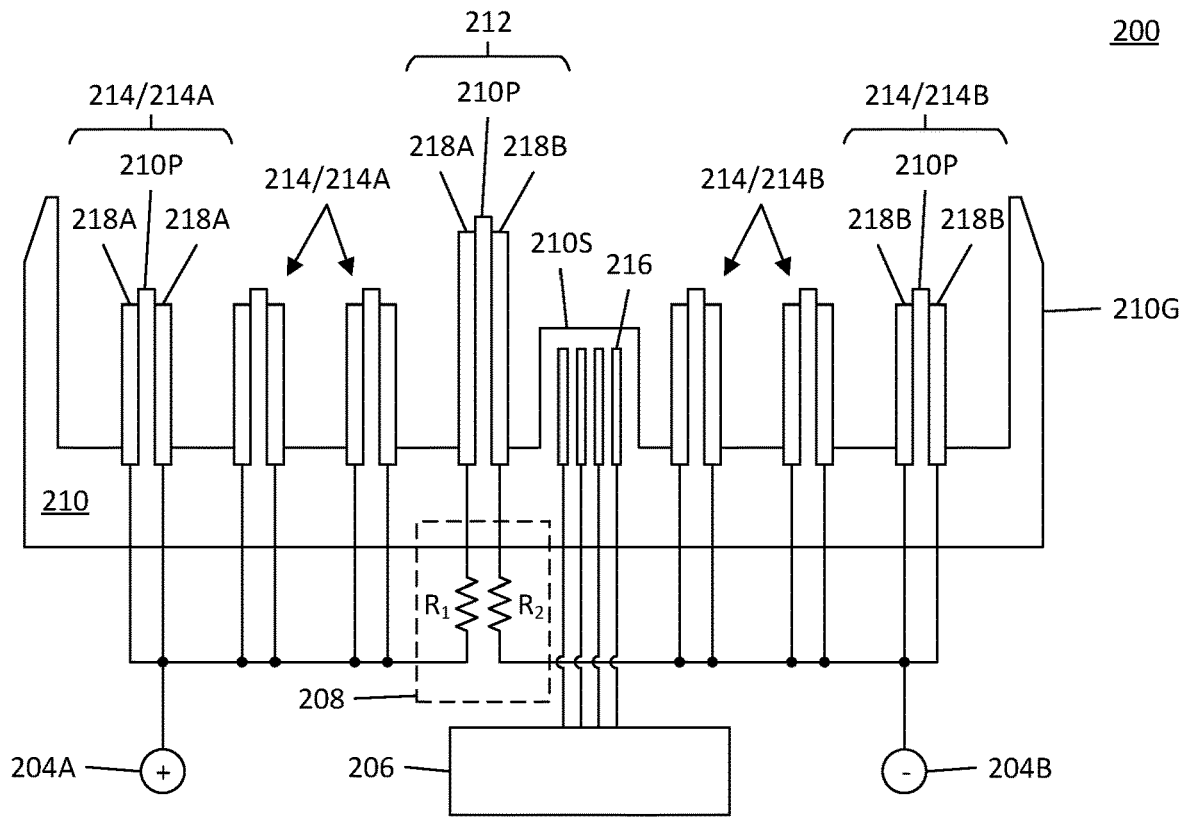
FIG. 3 is a schematic diagram of a battery connector, according to some embodiments.
Figure 4:
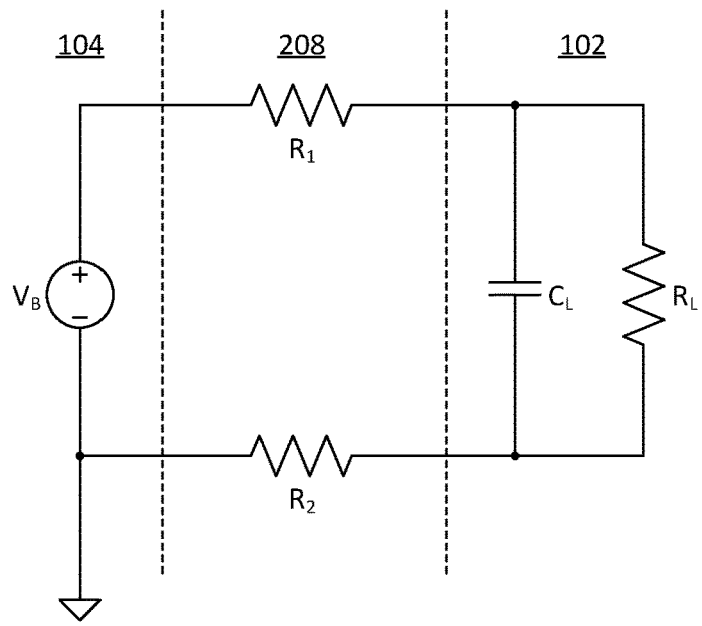
FIG. 4 is a circuit diagram illustrating details of an antispark circuit, according to some embodiments.

FIG. 3 is a schematic diagram of a battery connector 200, according to some embodiments. Specifically, a cross-sectional view of the battery connector 200 across the data pins 216, the charge pin 212, and the power pins 214 is shown, and details of the antispark circuit 208 are also shown. Some details of the battery connector 200 have been omitted for clarity of illustration. FIG. 4 is a circuit diagram illustrating details of the antispark circuit 208 of FIG. 3, according to some embodiments. The combined circuit formed by a battery 104, an antispark circuit 208, and a load 102 is shown.

A first subset of the power pins 214A (also referred to as positive power pins) are coupled to the positive power terminal 204A, and a second subset of the power pins 214B (also referred to as negative power pins) are coupled to the negative power terminal 204B. Specifically, a first subset of the conductors 218A (also referred to as positive conductors) are coupled to the positive power terminal 204A, and each positive power pin 214A includes two positive conductors 218A, with a projecting portion 210P of the connector housing 210 disposed therebetween. Similarly, a second subset of the conductors 218B (also referred to as negative conductors) are coupled to the negative power terminal 204B, and each negative power pin 214B includes two negative conductors 218B, with a projecting portion 210P of the connector housing 210 disposed therebetween.

The charge pin 212 is indirectly coupled to both the positive power terminal 204A and the negative power terminal 204B. Specifically, the charge pin 212 includes a positive conductor 218A and a negative conductor 218B, with a projecting portion 210P of the connector housing 210 disposed therebetween. As more clearly illustrated, the positive conductor 218A, the negative conductor 218B, and the projecting portion 210P of the charge pin 212 are each long than the power pins 214.

The positive power pins 214A are grouped together in one region of the battery connector 200, and the negative power pins 214B are grouped together in another region of the battery connector 200. The data pins 216 and the charge pin 212 are disposed between the group of the positive power pins 214A and the group of the negative power pins 214B. Specifically, the data pins 216 and the charge pin 212 are disposed at about the middle of the connector housing 210, the positive power pins 214A are disposed adjacent the charge pin 212, and the negative power pins 214B are disposed adjacent the data pins 216.

The load 102 is modeled as a capacitor $C_L$ in parallel with a resistor $R_L$. The capacitor $C_L$ and the resistor $R_L$ are large. For example, the capacitance of the capacitor $C_L$ can be in the range of about 100 µF to about 1000 µF and the resistance of the resistor $R_L$ can be in the range of about 1 kΩ, to about 100 kΩ.

In this embodiment, the antispark circuit 208 includes a first resistor $R_1$ and a second resistor $R_2$. The first resistor $R_1$ is connected in series between the positive power terminal 204A and the positive conductor 218A of the charge pin 212, and the second resistor $R_2$ is connected in series between the negative power terminal 204B and the negative conductor 218B of the charge pin 212. The resistors $R_1$, $R_2$ prevent the battery 104 from seeing a short circuit while the capacitor $C_L$ charges. As noted above, the delay between the connection of the charge pin 212 and the power pins 214 is sufficiently long to allow the capacitor $C_L$ to be charged. The resistance of the resistors $R_1$, $R_2$ is selected so that the transient response time of the RC circuit formed by the resistors $R_1$, $R_2$ and the capacitor $C_L$ is less than the connection delay. A transient response time of about five time constants of the RC circuit is sufficiently long to allow the capacitor $C_L$ to be charged and is also less than the connection delay. In an embodiment, the resistors $R_1$, $R_2$ each have a resistance of less than about 50Ω, such as a resistance in the range of about 3Ω to about 25Ω. Such a resistance can achieve a transient response time that is less than the connection delay discussed above (e.g., less than about 250 ms). In other words, such a resistance can achieve sufficient charging of the capacitor $C_L$ during the connection delay. The resistors $R_1$, $R_2$ are each small, and thus dissipate a large amount of energy while the capacitor $C_L$ charges. Because the resistors $R_1$, $R_2$ dissipate a large amount of energy, they are formed of a material that can dissipate the required amount of energy. For example, the resistors $R_1$, $R_2$ may be thick film resistors, ceramic resistors, or the like. Thus, the resistors $R_1$, $R_2$ can be more generally referred to as a dissipation circuit that is configured to charge the capacitor $C_L$ in response to the battery 104 being coupled to the charge pin 212.

Figure 5:
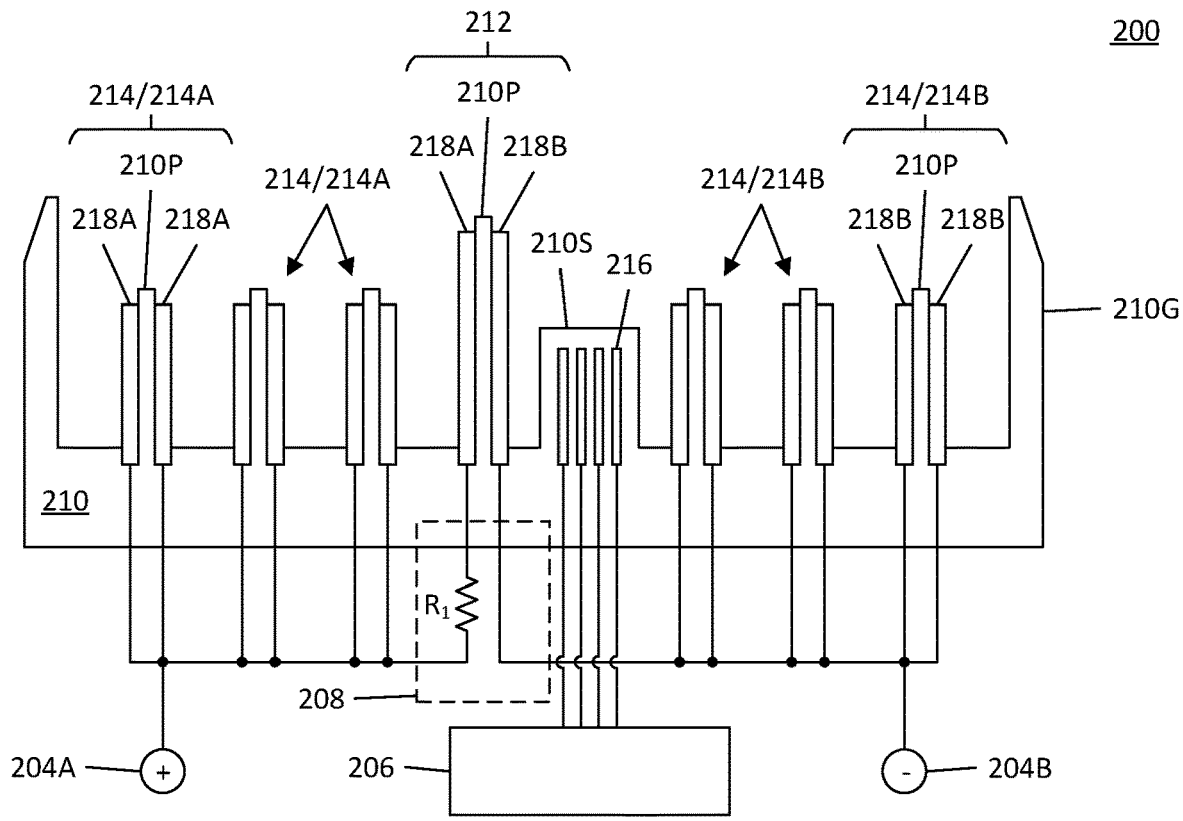
FIG. 5 is a schematic diagram of a battery connector, according to some embodiments.
Figure 6:
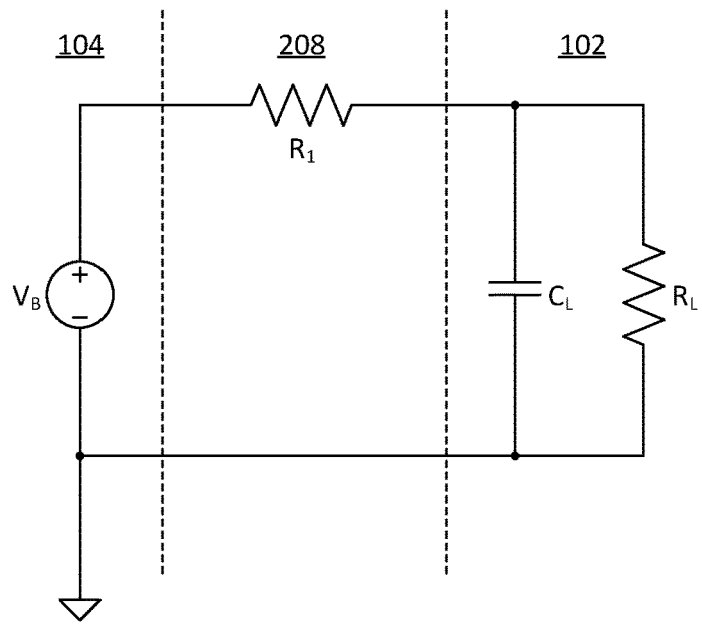
FIG. 6 is a circuit diagram illustrating details of an antispark circuit, according to some embodiments.

FIG. 5 is a schematic diagram of a battery connector 200, according to some embodiments. FIG. 6 is a circuit diagram illustrating details of the antispark circuit 208 of FIG. 5, according to some embodiments. The combined circuit formed by a battery 104, an antispark circuit 208, and a load 102 is shown. This embodiment is similar to that of FIGS. 3 and 4, except the antispark circuit 208 includes a single resistor $R_1$ connected in series between the positive power terminal 204A and the positive conductor 218A of the charge pin 212. The single resistor $R_1$ can also have a small resistance, which may be equal to the sum of the resistors $R_1$, $R_2$ of FIGS. 3 and 4. In an embodiment, the resistor $R_1$ has a resistance of less than about n, such as a resistance in the range of about 6Ω to about 50Ω. Such a resistance can achieve sufficient charging of the capacitor $C_L$ during the connection delay discussed above (e.g., less than about 250 ms).

Figure 7:
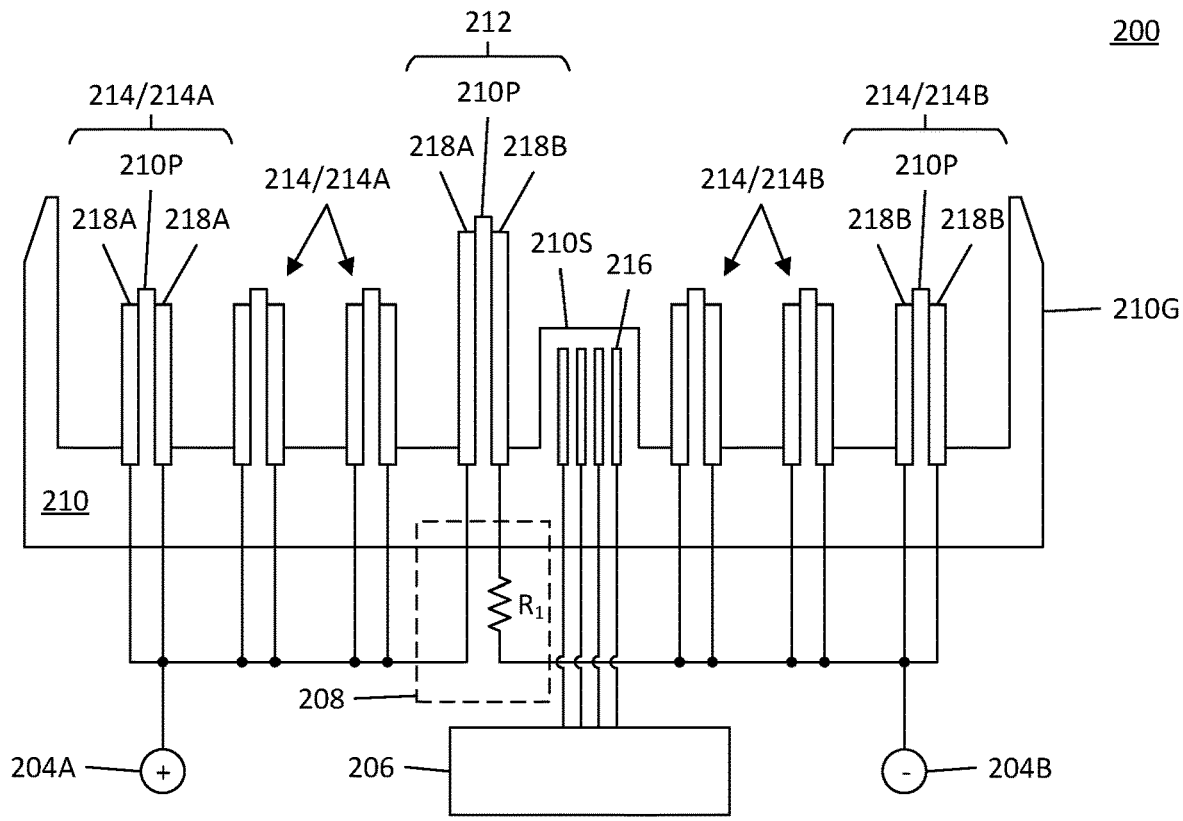
FIG. 7 is a schematic diagram of a battery connector, according to some embodiments.
Figure 8:
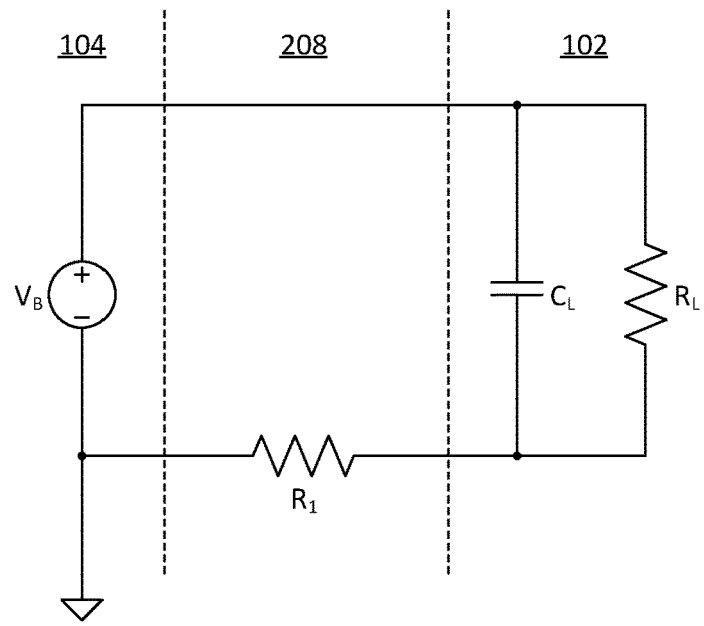
FIG. 8 is a circuit diagram illustrating details of an antispark circuit, according to some embodiments.

FIG. 7 is a schematic diagram of a battery connector 200, according to some embodiments. FIG. 8 is a circuit diagram illustrating details of the antispark circuit 208 of FIG. 7, according to some embodiments. The combined circuit formed by a battery 104, an antispark circuit 208, and a load 102 is shown. This embodiment is similar to that of FIGS. 3 and 4, except the antispark circuit 208 includes a single resistor $R_1$ connected in series between the negative power terminal 204B and the negative conductor 218B of the charge pin 212. The single resistor $R_1$ can also have a small resistance, which may be equal to the sum of the resistors $R_1$, $R_2$ of FIGS. 3 and 4. In an embodiment, the resistor $R_1$ has a resistance of less than about n, such as a resistance in the range of about 6Ω to about 50Ω. Such a resistance can achieve sufficient charging of the capacitor $C_L$ during the connection delay discussed above (e.g., less than about 250 ms).

Figure 9:
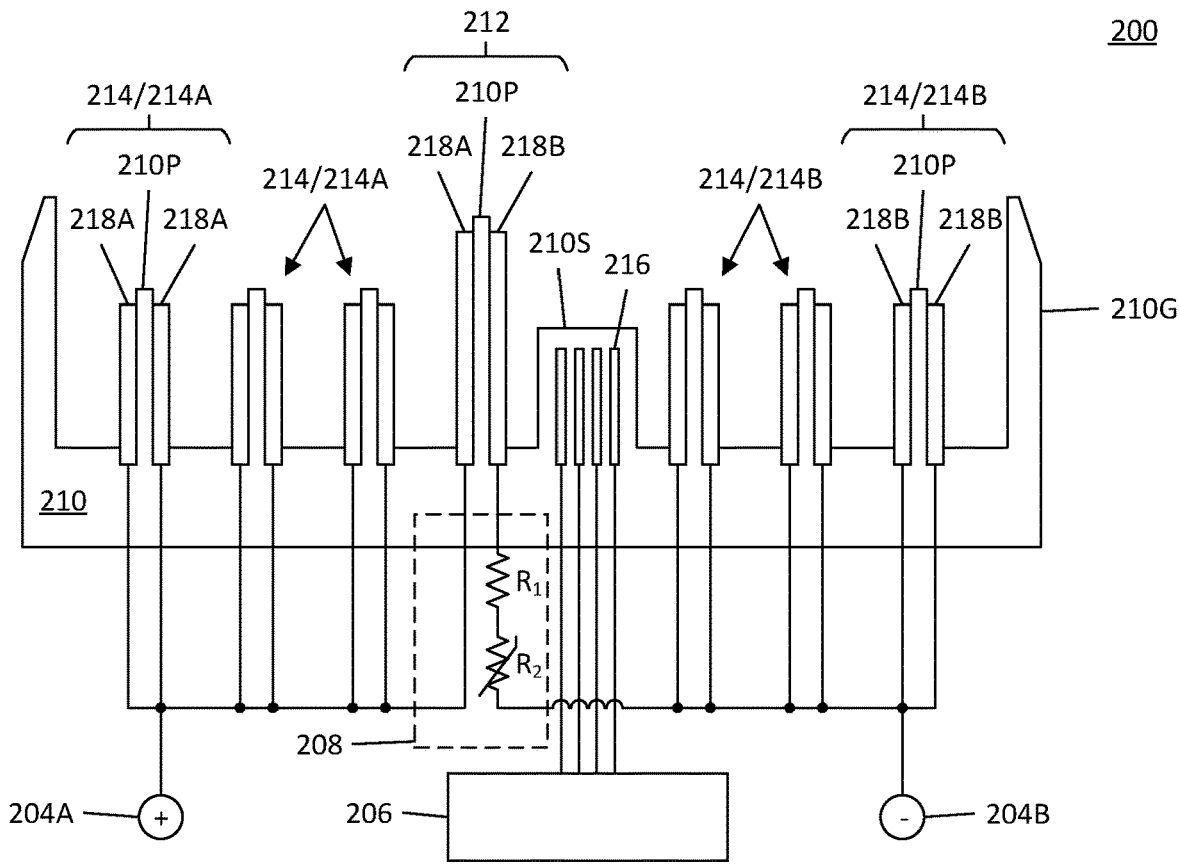
FIG. 9 is a schematic diagram of a battery connector, according to some embodiments.
Figure 10:
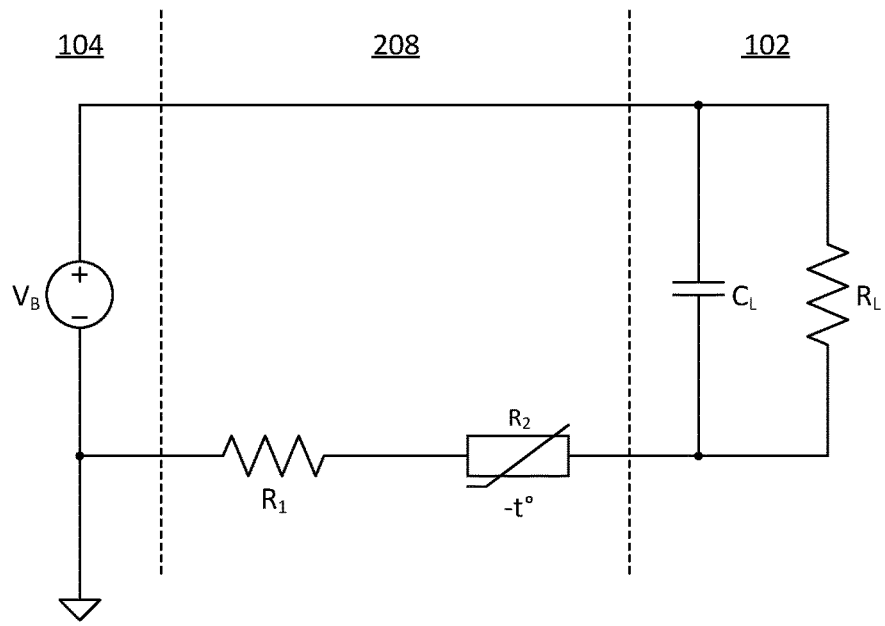
FIG. 10 is a circuit diagram illustrating details of an antispark circuit, according to some embodiments.

FIG. 9 is a schematic diagram of a battery connector 200, according to some embodiments. FIG. 10 is a circuit diagram illustrating details of the antispark circuit 208 of FIG. 9, according to some embodiments. The combined circuit formed by a battery 104, an antispark circuit 208, and a load 102 is shown. This embodiment is similar to that of FIGS. 7 and 8, except the antispark circuit 208 further includes a thermistor $R_2$ in series with a resistor $R_1$. In this embodiment, the resistor $R_1$ and the thermistor $R_2$ are connected in series between the negative power terminal 204B and the negative conductor 218B of the charge pin 212 (in a similar manner as FIGS. 7 and 8). In another embodiment, the resistor $R_1$ and the thermistor $R_2$ can be connected in series between the positive power terminal 204A and the positive conductor 218A of the charge pin 212 (in a similar manner as FIGS. 5 and 6). In yet another embodiment, the resistor $R_1$ and the thermistor $R_2$ can be split between the positive power terminal 204A and the negative power terminal 204B (in a similar manner as FIGS. 3 and 4).

The resistor $R_1$ and the thermistor $R_2$ form a RC circuit with the capacitor $C_L$, where the RC circuit has a transient response time that is less than the delay between the connection of the charge pin 212 and the power pins 214. The thermistor $R_2$ has a negative temperature coefficient (NTC), so that the resistance of the thermistor $R_2$ decreases as temperature rises. For example, the thermistor $R_2$ can have a resistance in the range of about 22 kΩ to about 100 kΩ at initial connection, and can decrease to a resistance in the range of about 0Ω to about 1Ω after it warms. The thermistor $R_2$ thus acts as an inrush current limiter, so that little to no charging of the capacitor $C_L$ occurs until the thermistor $R_2$ warms. As a result, charging of the capacitor $C_L$ is effectively delayed for a brief period after charge pin 212 is connected, which can correct for bouncing at initial connection of the charge pin 212. Correcting for bouncing can help ensure that charging of the capacitor $C_L$ does not begin until mating of the charge pin 212 is complete, which can help further decrease sparking during connection. Thus, the thermistor $R_2$ can be more generally referred to as a delay circuit that is configured to delay charging of the capacitor $C_L$ for a predetermined duration after the battery 104 is coupled to the charge pin 212.

Figure 11:
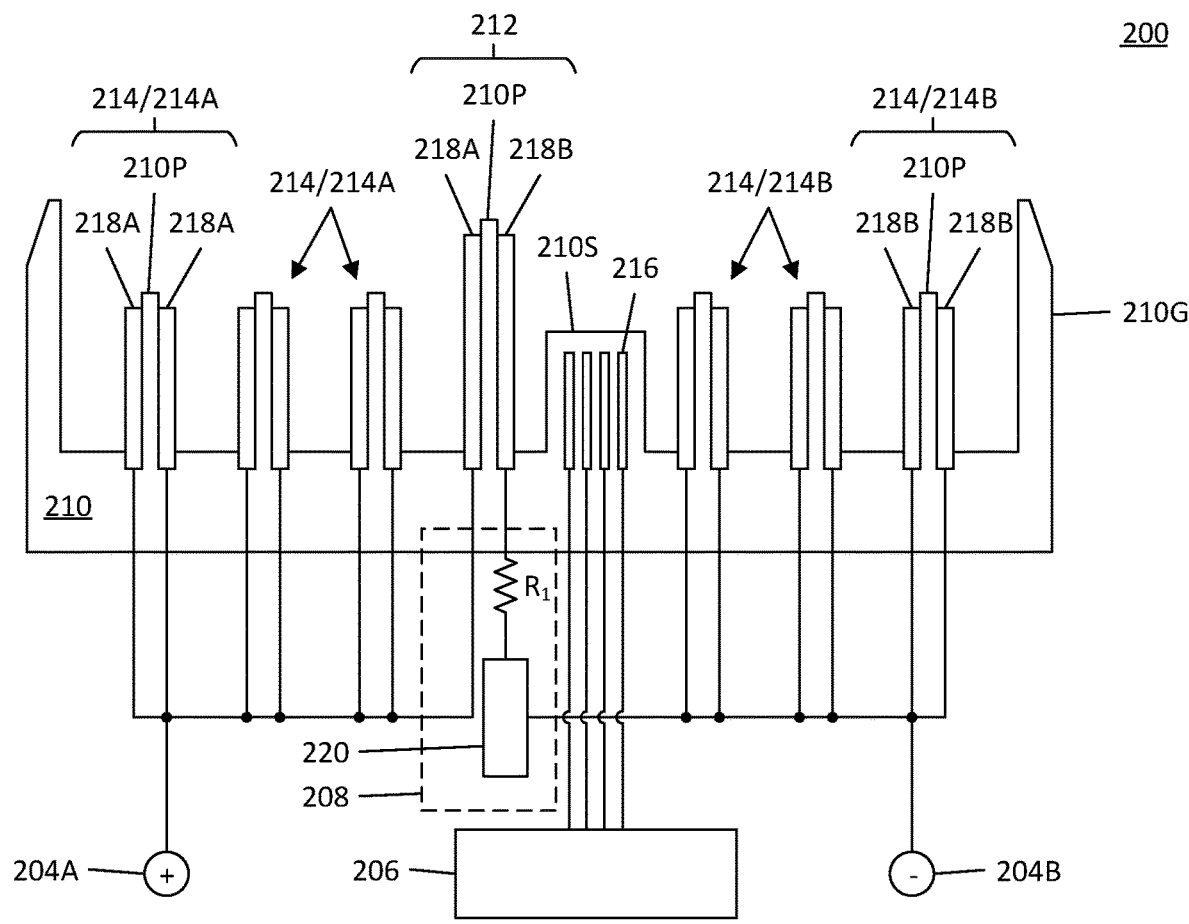
FIG. 11 is a schematic diagram of a battery connector, according to some embodiments.
Figure 12:
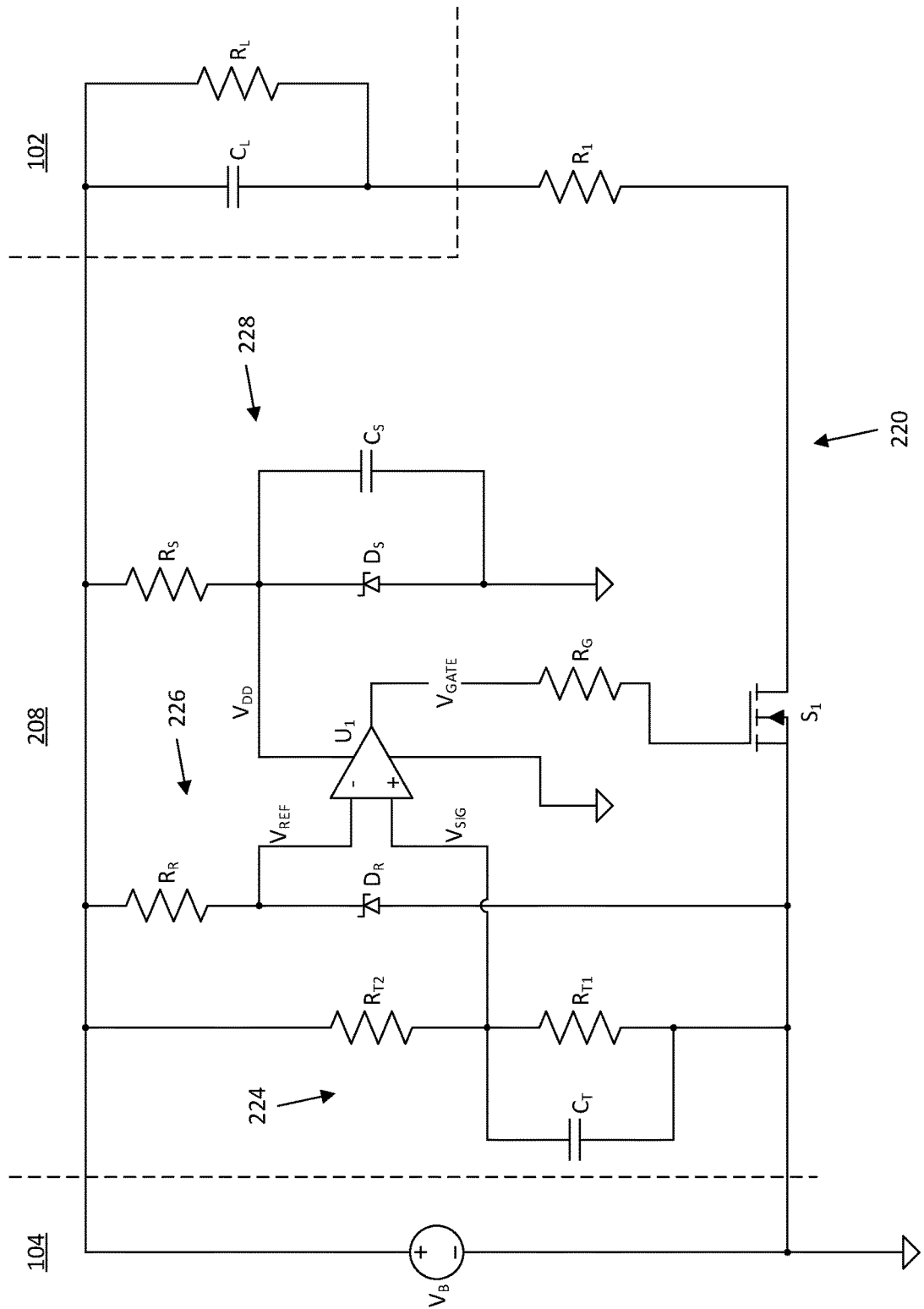
FIG. 12 is a circuit diagram illustrating details of an antispark circuit, according to some embodiments.

FIG. 11 is a schematic diagram of a battery connector 200, according to some embodiments. FIG. 12 is a circuit diagram illustrating details of the antispark circuit 208 of FIG. 11, according to some embodiments. The combined circuit formed by a battery 104, an antispark circuit 208, and a load 102 is shown. This embodiment is similar to that of FIGS. 7 and 8, except the antispark circuit 208 further includes a delay circuit 220 in series with a resistor $R_1$. In this embodiment, the resistor $R_1$ and the delay circuit 220 are connected in series between the negative power terminal 204B and the negative conductor 218B of the charge pin 212 (in a similar manner as FIGS. 7 and 8). In another embodiment, the resistor $R_1$ and the delay circuit 220 can be connected in series between the positive power terminal 204A and the positive conductor 218A of the charge pin 212 (in a similar manner as FIGS. 5 and 6). The delay circuit 220 includes passive device and active devices, and can provide a more accurate delay before charging of the capacitor $C_L$ begins. Specifically, the delay circuit 220 does not use thermistors, and thus its operation is not temperature-dependent, thereby allowing for more consistent operation through varying temperatures. The delay circuit 220 can be an integrated circuit device formed on a single substrate, or can include devices on different substrates that are interconnected by the conductive traces of the printed circuit board 202 (see FIGS. 2A and 2B).

The delay circuit 220 includes a switch $S_1$, a timer circuit 224, a reference circuit 226, a power supply circuit 228, and a compare circuit $U_1$. The delay circuit 220 is configured to turn on the switch $S_1$ a predetermined amount of time after the battery 104 is connected to the delay circuit 220. When the switch $S_1$ is turned on, the battery 104 is coupled to the load 102 and the resistor $R_1$, and the antispark circuit 208 begins functioning in a manner similar as that described above for FIGS. 7 and 8. Specifically, the resistor $R_1$ prevents the battery 104 from seeing a short circuit while the capacitor $C_L$ charges and the resistor $R_1$ dissipates energy.

The switch $S_1$ is connected in series with (e.g., between) the battery 104 and the load 102 so that the battery 104 is connected to the load 102 and the resistor $R_1$ when the switch $S_1$ is turned on and the battery 104 is disconnected from the load 102 and the resistor $R_1$ when the switch $S_1$ is turned off. The switch $S_1$ may be a MOSFET, a mechanical relay, or the like. In this embodiment, the switch $S_1$ is a n-type MOSFET, and the source and the drain of the MOSFET are in series with the capacitor $C_L$ and the resistor $R_1$.

The timer circuit 224 is configured to produce a timer signal $V_{SIG}$ during operation. The timer circuit 224 includes a resistor $R_{T1}$ in parallel with a capacitor $C_T$, and a resistor $R_{T2}$ in series with each of the capacitor $C_T$ and the resistor $R_{T1}$. The capacitor $C_T$ and the resistors $R_{T1}$, $R_{T2}$ form a voltage divider RC circuit, such that when the battery 104 is connected to the delay circuit 220, the capacitor $C_T$ begins charging and the timer signal V SIG begins increasing. The timer signal $V_{SIG}$ increases until the capacitor $C_T$ is charged. The capacitor $C_T$ and the resistors $R_{T1}$, $R_{T2}$ are selected so that the time constant of the RC circuit is a desired duration, and thus the timer signal $V_{SIG}$ increases over a predetermined duration. Larger time constants will result in the capacitor $C_T$ taking longer to charge, and thus increase the duration of the delay before the switch $S_1$ is turned on. In some embodiments, the delay is the range of about 10 ms to about 50 ms, which is sufficient to ensure bouncing of the charge pin 212 has ceased and mating is complete.

The reference circuit 226 is configured to produce a constant reference signal $V_{REF}$ during operation. The reference circuit 226 includes a Zener diode $D_R$ in series with a resistor $R_R$. The Zener diode D R and the resistor $R_R$ form a voltage regulator, such that the reference signal $V_{REF}$ equals the Zener voltage of the Zener diode $D_R$ (e.g., 10 V in some embodiments). The Zener diode $D_R$ is selected so that the reference signal $V_{REF}$ is less than the maximum value of the timer signal $V_{SIG}$ output by the timer circuit 224.

The compare circuit $U_1$ is configured to compare the timer signal $V_{SIG}$ to the reference signal $V_{REF}$ and turn on the switch $S_1$ when the timer signal $V_{SIG}$ exceeds the reference signal $V_{REF}$. During operation, the capacitor $C_T$ is uncharged, and so the timer signal $V_{SIG}$ is initially less than the reference signal $V_{REF}$. However, once the capacitor $C_T$ is sufficiently charged, the timer signal $V_{SIG}$ is greater than the reference signal $V_{REF}$. Thus, the switch $S_1$ is turned on a predetermined amount of time after the battery 104 is connected. The compare circuit $U_1$ may include an op-amp, a comparator, or the like. In this embodiment, the switch $S_1$ is a n-type MOSFET, and the compare circuit $U_1$ includes an op-amp. The output of the op-amp is coupled to the gate of the MOSFET, with a resistor $R_G$ optionally interposed therebetween. The resistor $R_G$ helps limit the charge current required to charge the gate capacitance of the MOSFET. The op-amp receives the reference signal $V_{REF}$ at its inverting input, receives the timer signal Vs IG at its non-inverting input, and produces a gate control signal $V_{GATE}$ at its output. When the timer signal $V_{SIG}$ is less than the reference signal $V_{REF}$, the op-amp outputs a low gate control signal $V_{GATE}$ so that the MOSFET is turned off. Similarly, when the timer signal $V_{SIG}$ is greater than the reference signal $V_{REF}$, the op-amp outputs a high gate control signal $V_{GATE}$ so that the MOSFET is turned on. It should be appreciated that other types of compare circuits and/or switches may be used. For example, as noted above, the switch $S_1$ may be another type of switch, such as a mechanical relay. Appropriate components may be included with or omitted from the delay circuit 220 as needed to control other types of switches.

The power supply circuit 228 outputs a supply signal $V_{DD}$ used to power the compare circuit $U_1$. The power supply circuit 228 includes a Zener diode $D_S$ in parallel with a capacitor $C_S$, and a resistor $R_S$ in series with each of the Zener diode $D_S$ and the capacitor $C_S$. The Zener diode $D_S$ and the resistor $R_S$ form a voltage regulator, such that the supply signal $V_{DD}$ equals the Zener voltage of the Zener diode $D_S$ (e.g., 15 V in some embodiments). The Zener diode $D_S$ is selected so that the supply signal $V_{DD}$ is greater than the reference signal $V_{REF}$ and the timer signal $V_{SIG}$. The capacitor $C_S$ helps stabilize the supply signal $V_{DD}$.

Figure 13:
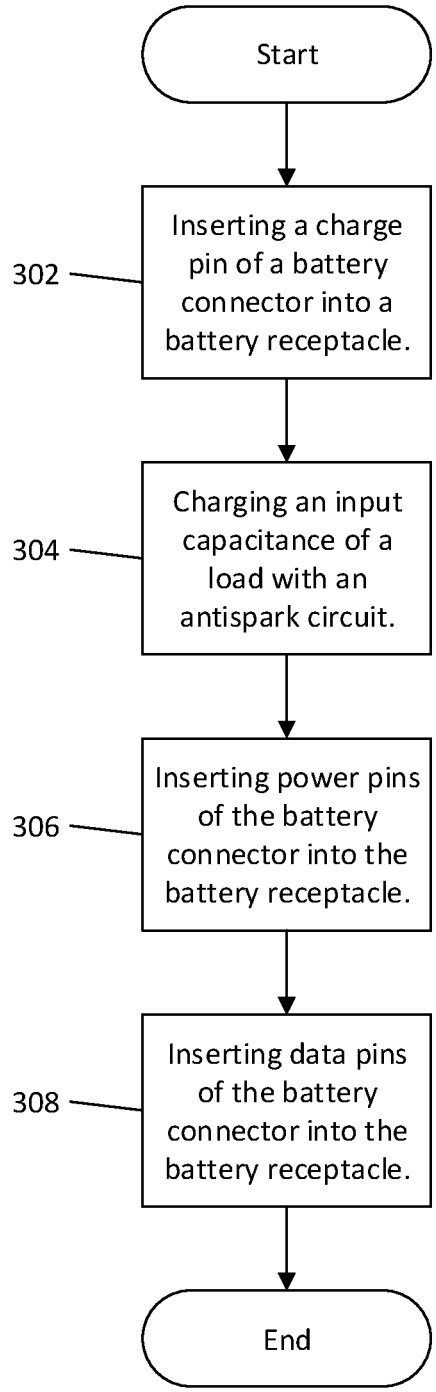
FIG. 13 is a block diagram of a battery installation method, according to some embodiments.

FIG. 13 is a block diagram of a battery installation method 300, according to some embodiments. The battery installation method 300 may be used to install a battery in an electronic device. In operation 302, a charge pin of a battery connector is inserted into a socket of a battery. As noted above, the charge pin is coupled to an antispark circuit of the battery connector, which is coupled to power terminals of a load of the electronic device. In operation 304, the input capacitance of the load is charged with the antispark circuit. Optionally, the charging the input capacitance is delayed for a predetermined duration after inserting the charge pin into the battery socket. In operation 306, the power pins of the battery connector are inserted into the battery socket after charging the input capacitance of the load. As noted above, the power pins are directly coupled to the power terminals of the load, and the charge pin is longer than the power pins. In operation 308, the data pins of the battery connector are inserted into the battery socket, also after charging the input capacitance of the load. As noted above, the data pins are coupled to a computer of the electronic device.

The battery connector described herein may be used for connecting to a variety of electronic devices and load. In some embodiments, the electronic device is a vehicle such as a rotorcraft, and the load is a device of the rotorcraft, such as a power converter, which may be part of an engine or propulsion unit of the rotorcraft.

Figure 14:
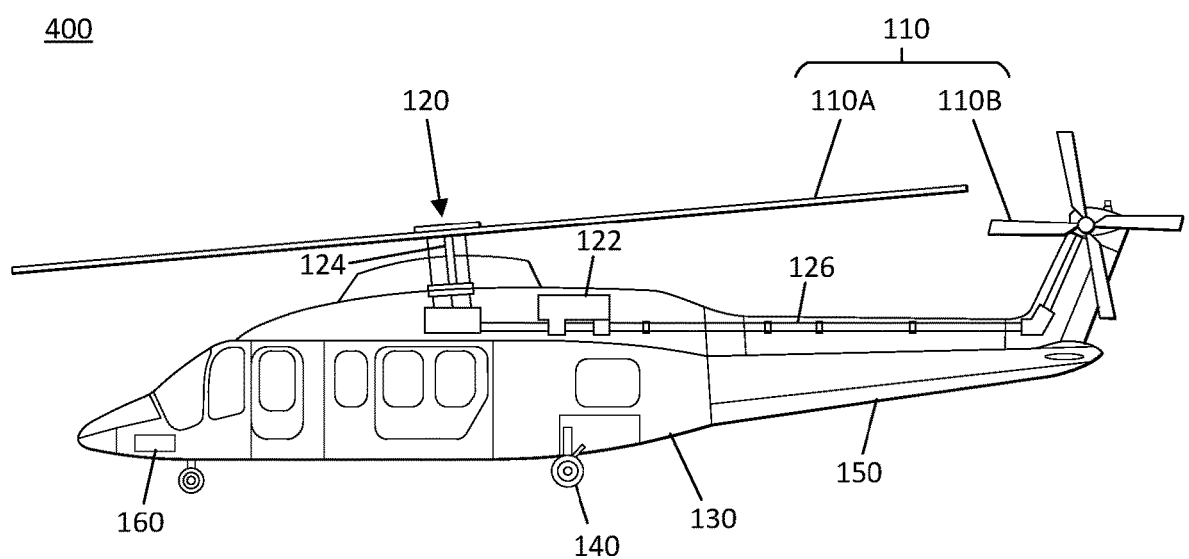
FIG. 14 illustrates a rotorcraft, according to some embodiments.

FIG. 14 illustrates aspects of a rotorcraft 400, according to some embodiments. The rotorcraft 400 includes rotor blades no, a powertrain 120, a fuselage 130, landing gear 140, an empennage iso, and rotorcraft computers 160. It should be appreciated that some of teachings from the rotorcraft 400 may apply to aircraft other than rotorcraft, such as airplanes, tilt rotor aircraft, unmanned aircraft, and the like.

The rotor blades no include main rotor blades 110A and tail rotor blades 110B. The powertrain 120 rotates the main rotor blades 110A and optionally the tail rotor blades 110B. The powertrain 120 includes one or more engines 122, a rotor mast 124, and a drive shaft 126. The engines 122 supply torque to the rotor mast 124 via the drive shaft 126 to rotate the main rotor blades 110A. The engines 122 may also supply torque to the drive shaft 126 to rotate the tail rotor blades 110B.

The fuselage 130 represents the body of the rotorcraft 400 and is coupled to the powertrain 120 such that the powertrain 120 and the rotor blades no move the fuselage 130 through the air during operation. The landing gear 140 supports the rotorcraft 400 when the rotorcraft 400 is grounded. The empennage 150 represents the tail section of the aircraft and is connected to the tail rotor blades 110B. The powertrain 120 and the tail rotor blades 110B may collectively provide thrust in the same direction as the rotation of the main rotor blades 110A, so as to counter torque effects created by the main rotor blades 110A.

The rotorcraft 400 includes flight control devices operable to change the flight characteristics of the rotorcraft 400. The flight control devices can be part of the rotor blades 110, the powertrain 120, the fuselage 130, and the like. The flight control devices include mechanical and/or electrical systems operable to change, e.g., the positions or angle of attack of the rotor blades 110, the power output of the engines 122, and the like. In some embodiments, the flight control devices include a swashplate for collectively or cyclically controlling the pitch of each of the main rotor blades 110A in order to selectively control direction, thrust, and lift of the rotorcraft 400. In some embodiments, the flight control devices include a tail rotor actuator for collectively controlling the pitch of the tail rotor blades 110B in order to selectively control yaw of the rotorcraft 400. In some embodiments, the flight control devices include an engine control computer for selectively varying the power output of the engines 122. Other examples of flight control devices include horizontal or vertical stabilizers, rudder, elevators, or other control or stabilizing surfaces that are used to control or stabilize flight of the rotorcraft 400.

The rotorcraft computers 160 are operable to collect data about, or control flight of, the rotorcraft 400. In some embodiments, the rotorcraft 400 is a fly-by-wire (FBW) rotorcraft, and the rotorcraft computers 160 include flight control computers (FCCs) operable to execute one or more control laws (CLAWS) that control flight of the rotorcraft 400. For example, the rotorcraft computers 160 can send electrical signals to the engines 122, the actuators for the swashplate, the tail rotor actuators, or the like to control flight of the rotorcraft 400. The rotorcraft computers 160 may be operable to perform sensor data collection and analysis as part of a health and usage monitoring system (HUMS), a flight control system, a sensor system, a monitoring system, or the like.

Figure 15:
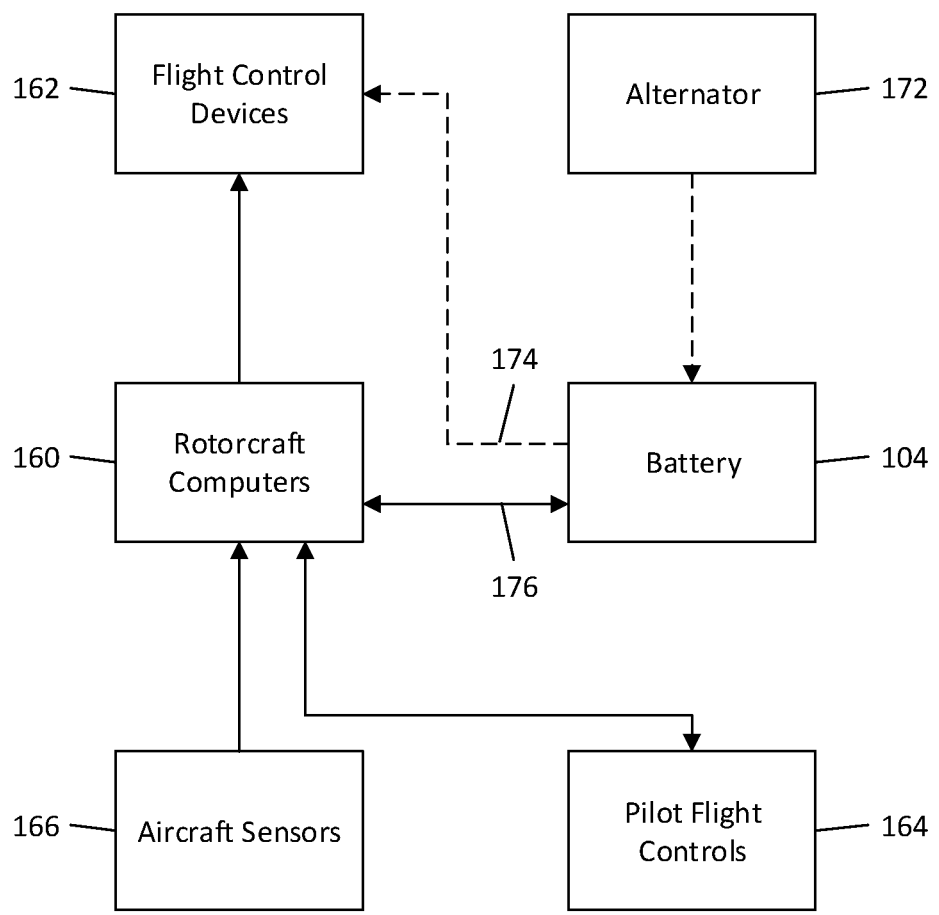
FIG. 15 is a block diagram of aspects of a rotorcraft, according to some embodiments.

FIG. 15 is a block diagram of aspects of a rotorcraft 400, according to some embodiments. Specifically, features for controlling flight of the rotorcraft 400 are shown. The rotorcraft computers 160 can be part of a flight control system used to control the flight control devices 162 (described above), thus controlling flight of the rotorcraft 400. The rotorcraft computers 160 receive input signals from multiple sources, such as pilot flight controls 164 and aircraft sensors 166. Based on the input signals, the rotorcraft computers 160 transmit control signals to the flight control devices 162, which in some embodiments may be an engine control computer of an engine.

The pilot flight controls 164 include manual controls that a pilot may manipulate to control flight of the rotorcraft 400. Examples of the pilot flight controls 164 include a cyclic stick, a collective stick, pedals, and the like. In some embodiments, one or more of the pilot flight controls 164 include trim motors, which the rotorcraft computers 160 can command to move to a particular position, thereby providing flight control suggestions to the pilot.

The aircraft sensors 166 include sensors for measuring a variety of rotorcraft systems, flight parameters, environmental conditions and the like. For example, the aircraft sensors 166 may include sensors for measuring airspeed, altitude, attitude, position, orientation, temperature, airspeed, vertical speed, and the like. Other aircraft sensors 166 could include sensors relying upon data or signals originating external to the rotorcraft, such as a global positioning system (GPS) sensor, a VHF Omnidirectional Range sensor, Instrument Landing System (ILS), and the like.

The components of the rotorcraft 400 (e.g., the rotorcraft computers 160, the flight control devices 162, etc.) are powered by a battery 104. The battery 104 may be a rechargeable battery, such as a lithium-polymer battery, a lead-acid battery, or the like. The battery 104 may be charged onboard the rotorcraft 400 (e.g., by an alternator), or may be charged by an external battery charger that is not part of the rotorcraft 400. In some embodiments, the battery 104 is part of (e.g., disposed/installed in) a propulsion unit of the rotorcraft 400 (e.g., an engine 122, see FIG. 14). In another embodiment, the battery 104 is part of other components of the rotorcraft 400.

Charging of the battery 104 may be controlled by a battery management system (BMS). For example, the battery 104 may include a charging circuit that is controlled by the BMS. Parameters of the battery 104 may also be monitored by the BMS. For example, the battery 104 may include sensors for monitoring the discharge rate, cell voltages, temperature, and the like of the battery 104, which the BMS receives signals from. The BMS may be partially or wholly embodied as software and/or hardware for performing the desired functionality. For example, the BMS may be embodied as software executed by the rotorcraft computers 160, as hardware included with the rotorcraft computers 160, as a standalone management circuit/controller, or the like. In the illustrated embodiment, the BMS is embodied as software executed by the rotorcraft computers 160.

The battery 104 is connected to the components of the rotorcraft 400 (e.g., the flight control devices 162) by power connections 174, and the battery 104 is connected to the BMS (e.g., the rotorcraft computers 160) by data connections 176. The power connections 174 carry the power provided to the components of the rotorcraft 400. The data connections 176 carry data (e.g., control and/or sensor) signals communicated between the battery 104 and the rotorcraft computers 160. The data connections 176 may be connections for a serial communications protocol, such as I²C, SPI, RS232, or the like. The power connections 174 may be larger (e.g., have a lower gauge) than the data connections 176.

As noted above, in some embodiments, the battery 104 is installed in an engine of the rotorcraft 400. The engine can include a power converter having a battery connector, such as those described with respect to FIGS. 1 through 12. For example, the power connections 174 can be coupled to the power terminals 204 of a battery connector 200 (see FIGS. 2A and 2B), and the data connections 176 can be coupled to the data terminals 206 of the battery connector 200. In such embodiments, the power connections 174 and the data connections 176 are directly between the battery 104 and the engine it is installed in. The engine can have additional connections to other components of the rotorcraft 400 (e.g., the rotorcraft computers 160) for forwarding power/data signals to those other components.

Embodiments may achieve advantages. Forming the charge pin of a battery connector to be longer than the power pins of the battery connector allows the charge pin (and associated antispark circuit) to be connected to an electronic device before the power pins are connected to the electronic device. The antispark circuit may thus charge the input capacitance of the load of the electronic device during the delay before the power pins are connected. Charging the input capacitance of the load before connecting the full voltage source of the battery to the load can avoid sparking. Avoid sparking helps increase operator safety and prolongs the lifespan of the battery connector.

Although this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. An aircraft comprising:
    pilot flight controls;
    a flight control computer coupled to the pilot flight controls, the flight control computer configured to receive input signals from the pilot flight controls and generate control signals according to the input signals; and
    an engine comprising an engine control computer and a power converter, the engine control computer coupled to the flight control computer, the flight control computer further configured to transmit the control signals to the engine control computer, the power converter comprising power terminals and a battery connector, the battery connector comprising:
        an antispark circuit coupled to the power terminals;
        a charge pin coupled to the antispark circuit; and
        power pins coupled to the power terminals, the charge pin being longer than each of the power pins.

2. The aircraft of claim 1, wherein the flight control computer comprises data terminals, and the battery connector further comprises:
    data pins coupled to the data terminals, the data pins having a smaller width and a smaller spacing than the power pins.

3. The aircraft of claim 2, wherein the battery connector further comprises:
    a circuit board, wherein each of the data pins, the power pins, and the charge pin are attached to the circuit board; and
    a connector housing attached to the circuit board, wherein the data pins, the power pins, and the charge pin each extend from a same side of the connector housing.

4. The aircraft of claim 2, wherein the data terminals are part of a serial communications bus for the flight control computer.

5. The aircraft of claim 1, further comprising:
a battery connected to the power converter with the battery connector.

6. The aircraft of claim 1, wherein the power converter has an input capacitance, and the antispark circuit comprises:
a resistor in series with the input capacitance, the resistor and the input capacitance forming a RC circuit having a transient response time of less than 250 ms.

7. The aircraft of claim 6, wherein the antispark circuit further comprises:
a delay circuit in series with the resistor and the input capacitance, the delay circuit comprising passive devices and being free of active devices.

8. The aircraft of claim 7, wherein the delay circuit comprises a thermistor.

9. The aircraft of claim 6, wherein the antispark circuit further comprises:
a delay circuit in series with the resistor and the input capacitance, the delay circuit comprising passive devices and active devices.

10. The aircraft of claim 9, wherein the delay circuit comprises:
a switch connected in series with the resistor and the input capacitance;
a timer circuit configured to produce a timer signal;
a reference circuit configured to produce a reference signal; and
a compare circuit coupled to the reference circuit, the timer circuit, and the switch, the compare circuit configured to turn off the switch when the timer signal is less than the reference signal, the compare circuit configured to turn on the switch when the timer signal is greater than the reference signal.

11. The aircraft of claim 1, wherein the power pins are directly coupled to the power terminals such that no intervening circuits are interposed between the power pins and the power terminals.

12. An aircraft comprising:
an engine comprising a power converter, the power converter having an input capacitance, the power converter comprising power terminals and a battery connector, the battery connector comprising:
power pins coupled to the power terminals;
a charge pin, the charge pin being longer than each of the power pins; and
an antispark circuit electrically interposed between the charge pin and the power terminals, the antispark circuit comprising a resistor in series with the input capacitance, the resistor and the input capacitance forming a RC circuit having a transient response time of less than 250 ms.

13. The aircraft of claim 12, further comprising:
pilot flight controls; and
a flight control computer coupled to the pilot flight controls and to an engine control computer of the engine, the flight control computer configured to receive input signals from the pilot flight controls, to generate control signals according to the input signals, and to transmit the control signals to the engine control computer.

14. The aircraft of claim 12, further comprising:
a battery comprising a battery socket, the battery connector inserted in the battery socket.

15. The aircraft of claim 12, wherein the antispark circuit further comprises a delay circuit in series with the resistor and the input capacitance, the delay circuit configured to delay charging of the input capacitance.

16. The aircraft of claim 15, wherein the delay circuit comprises a thermistor.

17. The aircraft of claim 15, wherein the delay circuit comprises a switch.

18. An aircraft comprising:
a battery management system comprising data terminals; and
an engine comprising a power converter, the power converter comprising power terminals and a battery connector, the battery connector comprising:
an antispark circuit coupled to the power terminals;
a charge pin coupled to the antispark circuit;
power pins coupled to the power terminals, the charge pin being longer than each of the power pins; and
data pins coupled to the data terminals, the data pins having a smaller width and a smaller spacing than the power pins.

19. The aircraft of claim 18, wherein the data terminals are part of a serial communications bus.

20. The aircraft of claim 18, wherein the battery connector further comprises:
a circuit board, wherein each of the data pins, the power pins, and the charge pin are attached to the circuit board; and
a connector housing attached to the circuit board, wherein the data pins, the power pins, and the charge pin each extend from a same side of the connector housing.

* * * * *